April 10, 1934.    G. W. BULLEY    1,953,923
HUMIDITY CONTROLLER
Filed April 23, 1932
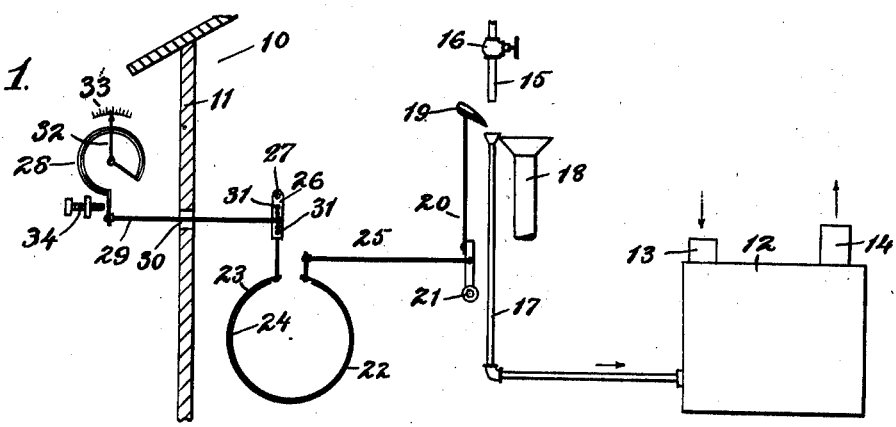
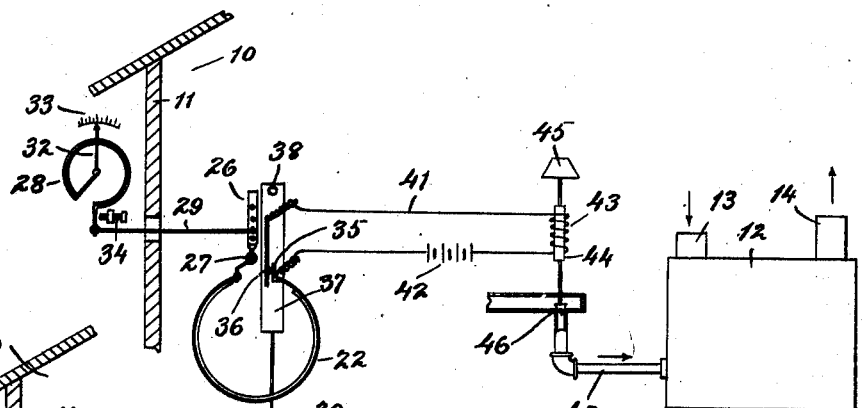
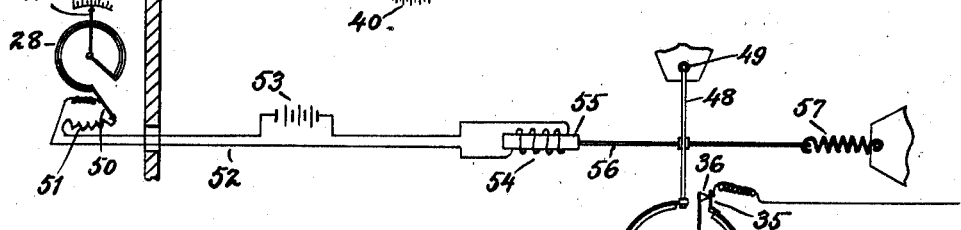
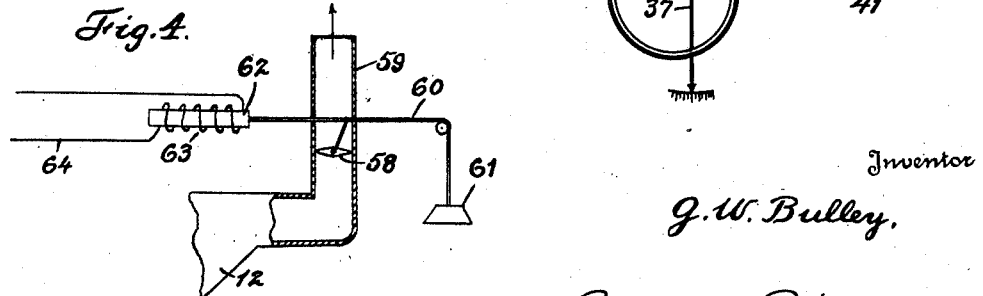
Inventor
G. W. Bulley,
By Robert M. Pierson,
Attorney Patented Apr. 10, 1934

1,953,923

UNITED STATES PATENT OFFICE 1,953,923

HUMIDITY CONTROLLER

George W. Bulley, Akron, Ohio

Application April 23, 1932, Serial No. 607,105

5 Claims. (Cl. 236—44)

This invention relates to means for controlling the relative humidity of air within an enclosure such as a building, for the purpose of increasing the comfort of the inhabitants, establishing proper conditions for carrying on certain manufacturing operations, etc.

The operation of such systems is often regulated automatically by means of a hygrostat or humistat including a hydrometer which is sensitive to the relative humidity of the air within the enclosure or to both the humidity and the temperature, and which controls the amount of moisture supplied to the air by a humidifier, which latter is often incorporated in an apparatus for heating the enclosure. When the outside temperature approaches or passes below the freezing point, the amount of vapor in the air within the enclosure will often be so great that it condenses on cold window panes and causes frosting of the panes or wetting of the window sills and the walls underneath the windows or both, because of the excess moisture. In order to correct such conditions it has heretofore been necessary to adjust the hygrostat or cut down the water or the vapor-laden air supply by hand when the objectionable condition appears or is imminent, or to employ delicate, complicated and expensive apparatus including separate wet and dry bulb thermostats and additional integrating and control devices for automatically varying the standard of control. So far as I am aware, no simple and direct means of accomplishing this purpose through automatic regulation of the standard of vapor supply according to outside temperature has heretofore existed in the art, although it has been proposed indirectly to control the operation of a humidifier by complicated photo-electric means dependent upon the transmission of light through the window pane from an artificial source outside of the building, or by varying the action of wet and dry bulb devices.

The object of my invention is to provide a simple and reliable method and apparatus for controlling the standard of vapor regulation or the amount of vapor supply inside the enclosure by a thermo-responsive device exposed to the outside temperature and acting to effect the desired control.

Of the accompanying drawing, Fig. 1 is a diagrammatic view illustrating one embodiment of my invention in which an outside thermostat operates through a mechanical connection upon an inside hygrostat, which latter in turn operates mechanically to control a humidifier.

Fig. 2 is a similar view illustrating a modification in which the connection between the hygrostat and the humidifier is electro-magnetic.

Fig. 3 is a diagrammatic view showing electromagnetic connections between the outside thermostat and the inside hygrostat.

Fig. 4 is a detail view showing a modified form of humidifier control adapted for substitution in the arrangement shown in Fig. 2, or in other arrangements as hereinafter explained.

Referring at first to Fig. 1, 10 is an enclosure having a building wall 11 separating it from the outside atmosphere to the left of said wall. 12 is a humidifier of any suitable type, which may also be a heater for the room or enclosure, having an air inlet 13 and an outlet 14 for mixed air and water vapor. The water may be supplied to and vaporized in the humidifier in any known or suitable manner and the supply regulated or the quantity of air which is mixed with vapor or the quantity of air and vapor mixture discharged from the humidifier regulated in a variety of ways by valves, deflectors, dampers, etc.

In this case I have illustrated a water-supply pipe 15 provided with a regulating hand-valve 16 which may be adjusted to pass a certain maximum quantity of water per unit of time either into the funnel mouth of a water pipe 17 leading to the humidifier or into the funnel mouth of a drain pipe 18 as determined by the position of a deflector plate 19 mounted on the upper end of a lever 20 pivoted at 21.

For automatic adjustment of the position of the deflector lever 20 I have shown a conventional form of hygrostat or humistat, whose hygrometer or operating element 22 consists of a C-shaped metal strip 23, the inner side of which is lined with a hygroscopic or moisture-sensitive strip 24, which may be of wood with the grain set edgewise and crosswise of the metal strip, or any suitable natural or artificial material having the desired property. Such hygrometers afford a direct measure of the humidity of the surrounding atmosphere, irrespective of temperature, although the hygrometer may include or be combined with temperature-responsive means. The hygrometer, together with means for transmitting or translating its movement, constitutes a hygrostat, as disinguished from a thermostat, whether of the wet-bulb or dry-bulb type, for measuring temperature and for regulating temperature or humidity or both. Thus the free end of the hygrometric element 22 is connected with one end of a rod 25 whose other end is pivotally connected with the lever 20. Its opposite or fixed end is carried by the lower end of a lever 26 of the third class which is pivoted at 27 so that said fixed end may be laterally adjusted to vary the standard of regulation of the hygrostat, that is, the effect of a given movement of its free end in changing the moisture supply. This hygrostatic regulator may be suitably supported on the inner side of the building wall 11. The element 22 constitutes a self-integrating, unitary device directly and mechanically responsive to sensible moisture or relative humidity in the air, as distinguished from separate thermometers of the thermo-couple or other type which are integrated electrically, pneumatically or otherwise through other apparatus such as galvanometers, piping, diaphragms etc., and it hence contributes to a simpler, more reliable and less expensive controlling system of the character indicated.

Suitably supported on the outer side of the building wall 11 and hence exposed to the temperature of the outdoor air is a temperature-responsive device which may take any one of several well-known forms. I have selected for illustration a thermostat having a C-shaped thermometric element or thermometer 28 composed of two strips of dissimilar metals, such as steel and brass, of which the one having the higher rate of expansion, such as the brass, is located on the inner side. The free end of this element is mechanically connected, by a rod 29 passing through a hole 30 in the building wall, with the lever 26 which supports the fixed end of the hygrometric element 22, and the pivotal connection of said rod on the lever may be adjustable toward and from the lever pivot, as by placing it in any one of a series of holes 31 in said lever, so that a given movement of the thermometric element will result in a greater or less amount of adjustment of the fixed end of the hygrometric element. The fixed end of the thermometric element may also be moved to adjust the thermostat for a higher or lower standard of regulation, as by mounting it upon a pointer lever 32 whose upper arm is manually movable over a scale 33. 34 is an adjustable stop-screw for limiting the movement due to expansion of the thermometric element.

In the operation of this form of my invention, the connections of the hygrostat are set to maintain any desired normal degree of relative humidity, such as 40%, in the atmosphere within the enclosure, as determined by the relation of its setting to the position of the water-drip or stream deflector plate 19, the position of the parts illustrated in Fig. 1 permitting a free drip or flow of all of the water from the pipe 15 into the pipe 17. This initial setting may be accomplished, for example, by adjusting the pointer lever 32 of the thermostat, or it may be performed independently by the adjustment of means such as the lever 37 in Fig. 2 which will presently be described. Should the amount of vapor exceed that point, the hygrometric element 22 expands or uncurls, its free end acting through the rod 20 upon the lever 20 to shift the plate 19 into the path of the drip or stream and divert more or less of the water into the drain pipe 18 until the relative humidity falls to or slightly below the predetermined point, whereupon the hygrometric element contracts and moves the deflector plate to the left, allowing an increased quantity of water to fall into the pipe 17. This regulation is performed irrespective of the temperature of the air, which may be controlled by any suitable thermostatic means, not here shown. Concurrently with this action, during a part or the whole of its range, the lateral position of the fixed end of the hygrometric element 22 which is carried on the lever 26 is subject to automatic adjustment in accordance with the outside temperature by the action of the thermometer element 28, an increase in temperature causing said element to expand or uncurl and move the hygrometric element and its connections to the left by means of the rod 29, thus increasing the water supply to the humidifier 12 and increasing the amount of vapor in the enclosure to correspond with the rise in outside temperature. It is desirable to fix a limit to this vapor increase so that the humidity cannot rise above a predetermined point, such as 50% relative humidity, and this may be effected by setting the stop-screw 34 to limit the expanding movement of the thermometer. Such setting also establishes a predetermined outside temperature point at which the fall of outside temperature begins to be effective on the hygrometer by the contraction of the thermometer. With a comparatively low outside temperature, creating conditions where the window panes would be frosted if the normal standard of humidity determined by the hygrostat were maintained, the contraction of the thermometric element 28 away from the stop-screw 34 swings the lever 26 to a degree causing the hygrometric element 22 and its connections to move to the right and decrease the water supply to the humidifier 12 so far as to reduce the standard of regulation below the normal, say to 30% relative humidity, thereby maintaining the amount of moisture in the air within the enclosure below the point of troublesome condensation upon the window panes.

In the modification illustrated in Fig. 2, the general arrangement of the thermometric, its limit stop, the hygrometer and their mechanical connection are the same as in Fig. 1 except that the hygrometer 22 is mounted on a lever 26 of the first class and the positions of the free and fixed ends of the thermometric element 28 are reversed so that the expansion thereof moves the hygrometric element, as before, to the right. In this case I have shown the free end of the hygrometric element 22 provided with a switch contact 35 coacting with a supplemental switch contact 36 mounted on a swinging support or lever 37 which is pivoted at 38 and provided with a pointer 39 movable over a scale 40 to vary the initial setting of the hygrostat or the point at which the switch is closed with reference to a given moisture content of the air. The switch contacts are included in an electrical circuit 41 with a source of current such as a battery 42 and the winding of a solenoid 43 whose core 44 is provided on its upper end with a weight 45 and on its lower end with a valve 46 controlling the supply of water through a pipe 47 to the humidifier 12.

In the operation of this modification, when the amount of water vapor in the enclosure 10 increases beyond the point for which the hygrostat is set, the expansion of the hygrometric element 22 opens the switch 35, 36, breaking the electrical circuit and allowing the water supply valve 46 to close and remain closed until the interior atmosphere has dried out to a point where the hygrometric element again closes the switch and opens the water valve. Should the outdoor temperature fall below a certain point determined by the setting of the stop-screw 34, the contraction of the thermometer 28, moving the rod 29 to the left and the hygrometric element 22 to the right, tends to open the switch 35, 36 if the latter was closed, thus breaking the circuit and stopping the water supply.

In the further modification illustrated in Fig. 3, the thermometric element 28 is placed as before on the outer side of the building wall 11, but acts upon the hygrostat through electro-magnetic connections so that said hygrostat may be placed in any convenient position inside the enclosure remote from that part of the building wall 11 which supports the thermostat. The free and fixed ends of the thermometric element in this case are arranged as in Fig. 1. The fixed end of the hygrometric element 22 is supported on a lever 48 pivoted at 49, and its free end controls a switch consisting of movable and fixed contacts 35 and 36 as in Fig. 2, the fixed contact being mounted on a pointer lever or support 37 pivoted at 38 for the purpose of adjusting its setting. The free end of the thermometric element 28 actuates a rheostat or potentiometer arm 50 movable over a resistance 51 included, with the arm, in a circuit 52 containing a current source 53 and the winding of a solenoid 54 whose core 55 in this case connects through a rod 56 with the hygrostat supporting lever 48 and with a spring 57 whose tension opposes the pull of the solenoid. This particular electro-magnetic connection between the thermostat and the hygrostat is merely illustrative of a number of arrangements of a non-mechanical or not wholly mechanical type which might be adopted to facilitate the location of the hygrostat independently of the thermostat. The switch contacts 35, 36 are included in a circuit 41 which may control the water supply of the humidifier in the manner indicated in Fig. 2, or may control the vapor supply furnished by the humidifier in any other suitable manner.

In the operation of this embodiment, the hygrometric element 22 functions as before to control the vapor supply and maintain the relative humidity at a predetermined point which is subject to variation by the action of the thermometric element 28. A reduction in the outside temperature below a predetermined point, which is fixed by the setting of the thermostat pointer 32, causes the arm 50 to move to the right over the resistance 51, increasing the amount of resistance in circuit with the solenoid 54 to a point where the spring 57 so far overcomes the pull of the solenoid as to shift the hygrostatic element 22 to the right to the extent of opening the switch 35, 36, thereby decreasing the amount of vapor in the manner previously indicated.

The thermostat in this case might have an expansion-limit stop similar to the one 34 previously described, although not illustrated in Fig. 3. The function of said stop in setting an upper limit to the rise in artificial humidification with increase of outside temperature might be performed in any of the described embodiments of my invention in any other suitable way.

In Fig. 4 is illustrated a modification employing a valve or damper 58 in an outlet pipe 59 leading from the humidifier 12, said damper having an arm actuated by a cord 60 provided with a weight 61 at one end and connected at its other end with the core 62 of a solenoid 63 whose winding is connected in a circuit 64. Said solenoid and circuit may correspond to the solenoid 43 and circuit 41 illustrated in Fig. 2, and the humidifier outlet 59 may be the main outlet for the vapor-laden air from the humidifier, so that this device could be substituted for the parts shown at the right in Fig. 3, the action of the weight 61 closing the damper 58 to reduce the moisture supplied to the enclosure when the hygrostat breaks the circuit of the solenoid. Or said outlet 59 could be an auxiliary outlet for vapor-laden air from the humidifier, which, conjointly with the main outlet, would normally provide a total vapor supply sufficient to maintain substantially the desired degree of humidity, and the solenoid 63 and circuit 64 could correspond to the solenoid 54 and circuit 52 of Fig. 3, subject to the action of the thermometric element 28 through the variable resistance 51, in which case the thermostat would directly affect the supply of vapor-laden air to the enclosure independently of hygrostatic control, cutting down the amount of vapor when the outside temperature falls below a certain point, and the main supply of vapor furnished by the humidifier could be automatically controlled by a hygrostat or otherwise regulated.

I have described my invention in several embodiments, but it will be understood that other modifications could be made and the form of the several elements widely varied without departing from the scope of the invention as defined in the claims.

I claim:

1. In a humidifying system, the combination of an enclosure, means for artificially heating and humidifying the air therein, unitary hygrometric means responsive to the humidity within said enclosure independently of the temperature therein for automatically controlling said humidity, and means exposed to the outdoor temperature and connected to control the standard of regulation of said hygrometric means for automatically lowering the relative humidity conformably with a lowering of the outdoor temperature.

2. In a humidifying system, the combination of a unitary device directly and mechanically responsive to the humidity of air within an enclosure, means affected by said device for varying the supply of moisture to the air, and means responsive to the temperature of the outside air and controlling the operation of said device for varying its effect upon the moisture supply.

3. In a humidifying system, the combination of a moisture-absorptive, expansible device for exposure to the air in a room, humidifying means controlled thereby, and temperature-responsive means for exposure to the external air, having a connection with said device for bodily shifting the latter to vary its standard of regulation.

4. A variable-standard humidity regulator comprising moisture-responsive m e c h a n i c a l means bodily movable in space and including an expansible moisture-absorptive element for location within an enclosure to regulate the humidity therein, a shiftable support for said means, and a temperature-responsive device for exposure outside of the enclosure, having a connection with said support for moving said moisture-responsive means.

5. A variable-standard humidity regulator comprising a moisture-responsive device including a moisture-absorptive expansible element and having a free end movable by expansion and contraction of said element, a lever supporting the other end of said device, and temperature-responsive means connected to rock said lever.

GEORGE W. BULLEY.